March 24, 1953 — J. M. HAUSER ET AL — 2,632,440
LEG BRACE JOINT AND LOCK
Filed Dec. 17, 1947 — 9 Sheets-Sheet 1
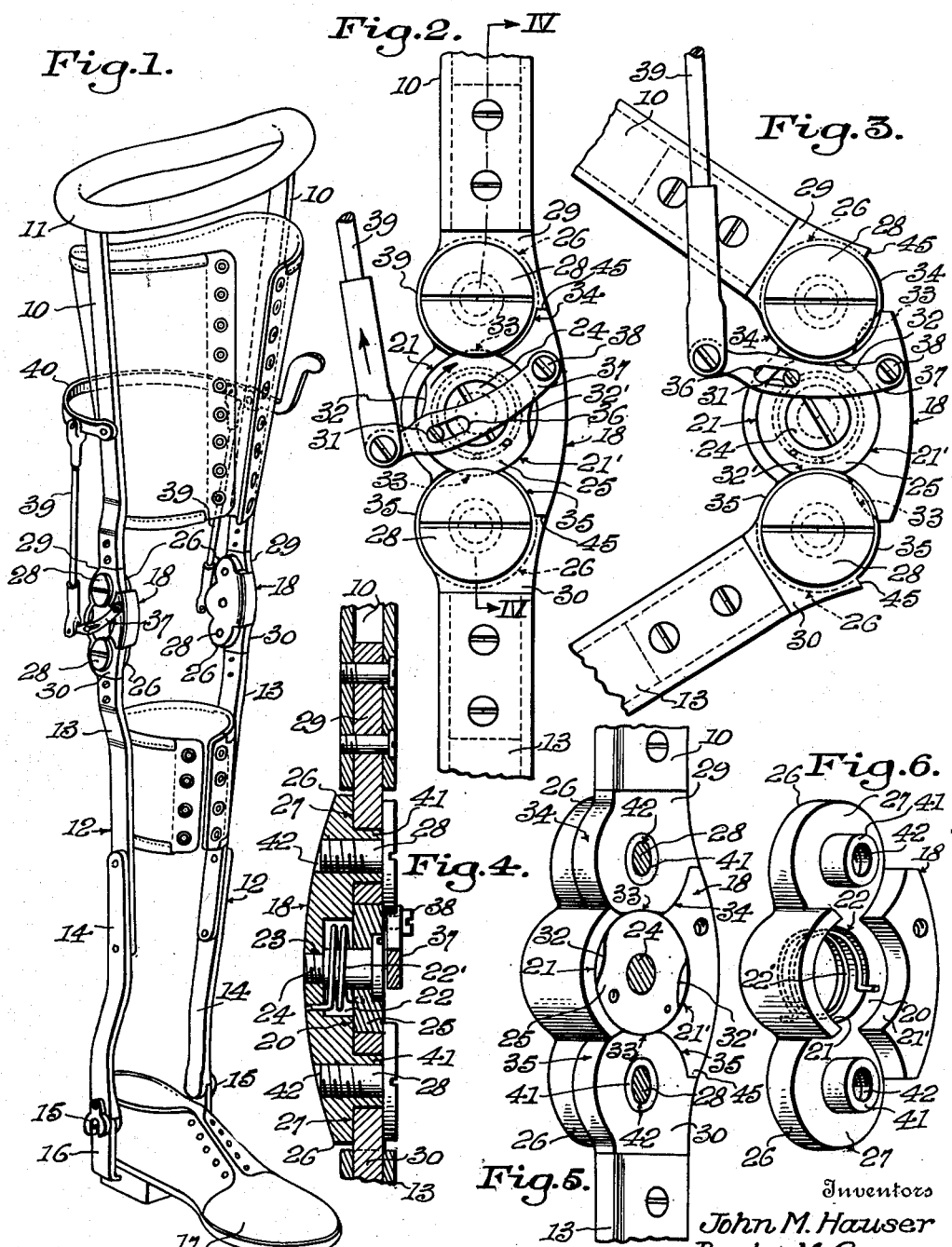
Inventors
John M. Hauser
Burke M. Snow
By George W. Gardes
Attorneys

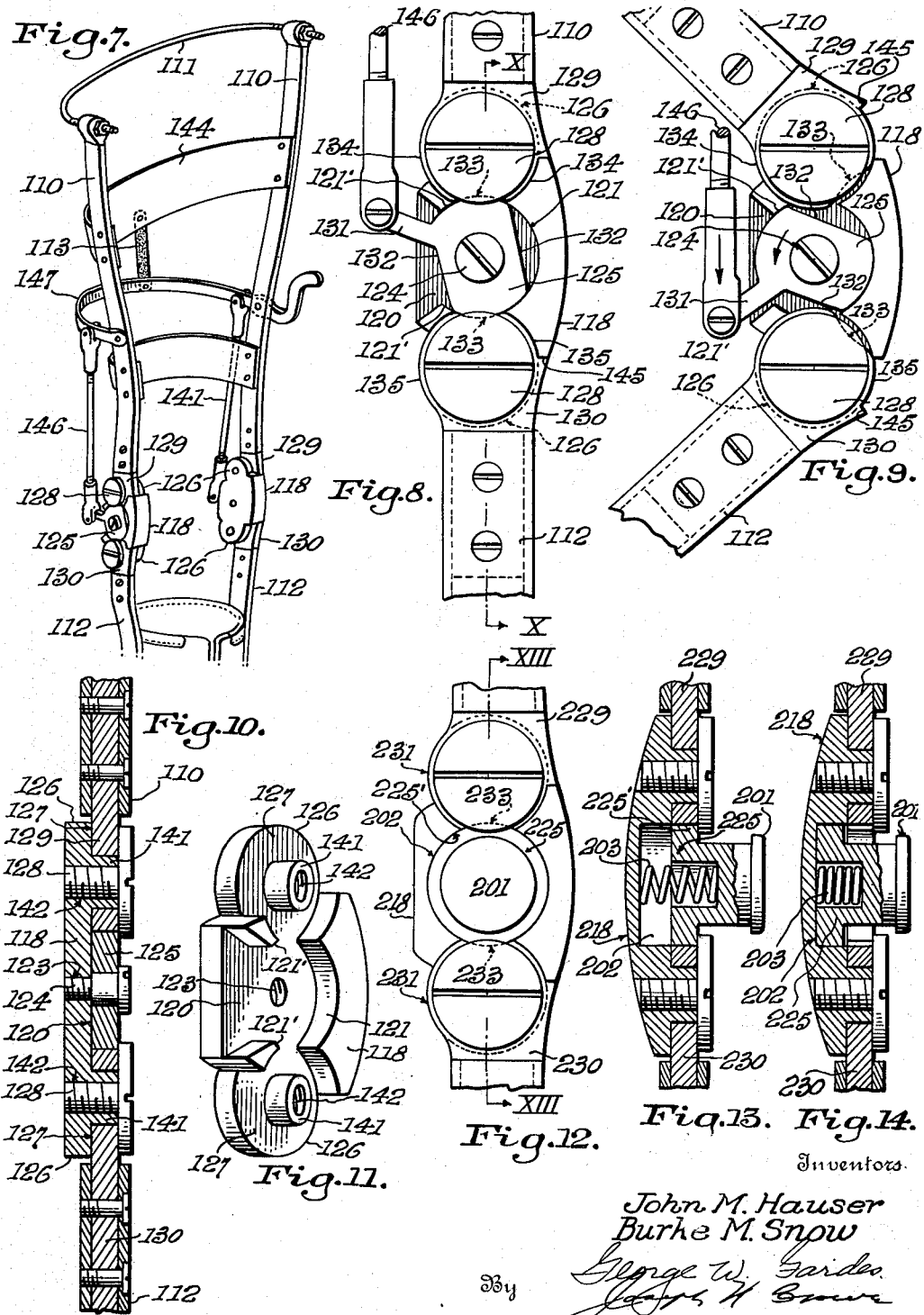

March 24, 1953 J. M. HAUSER ET AL 2,632,440
LEG BRACE JOINT AND LOCK
Filed Dec. 17, 1947 9 Sheets-Sheet 3
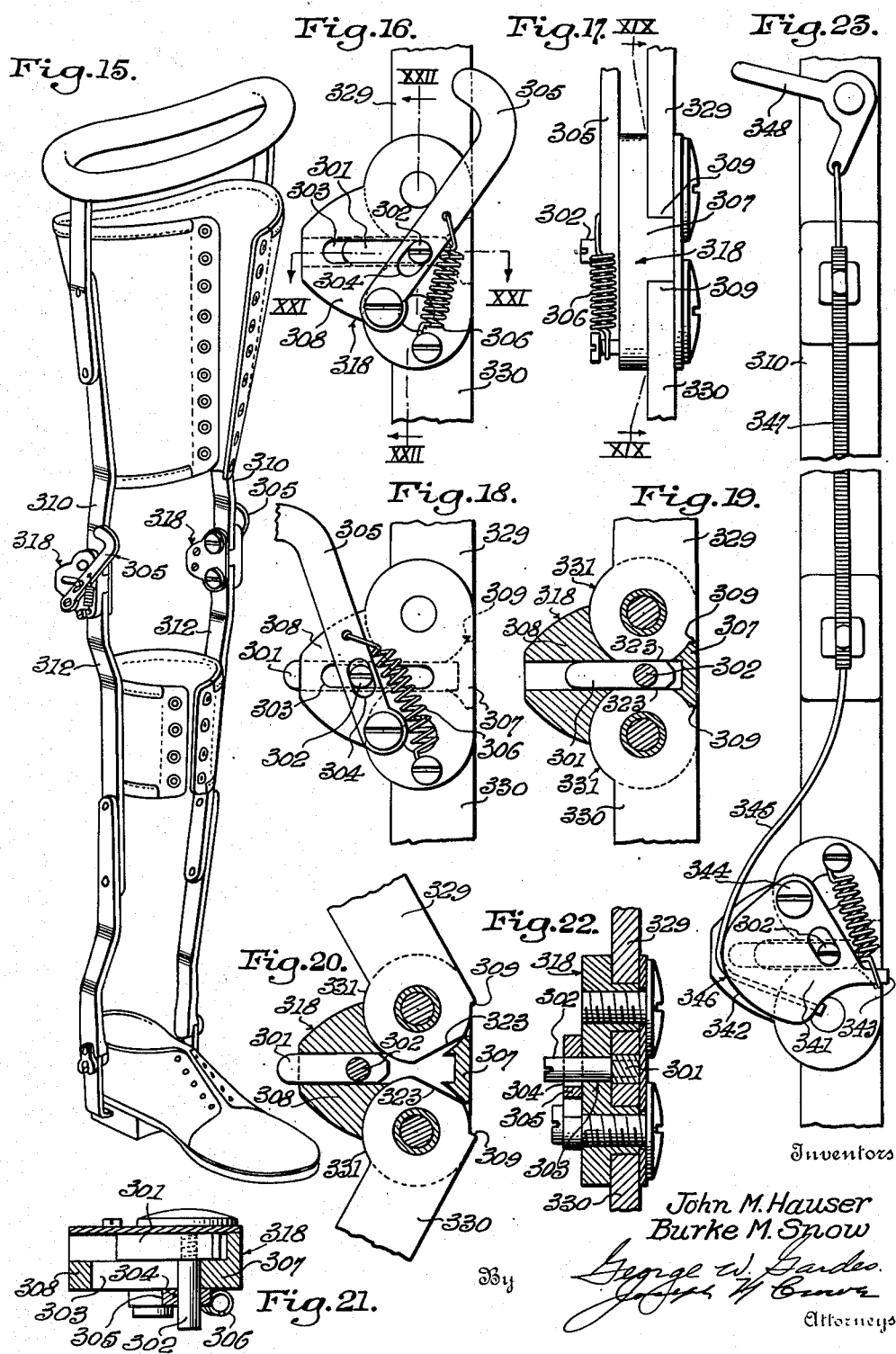

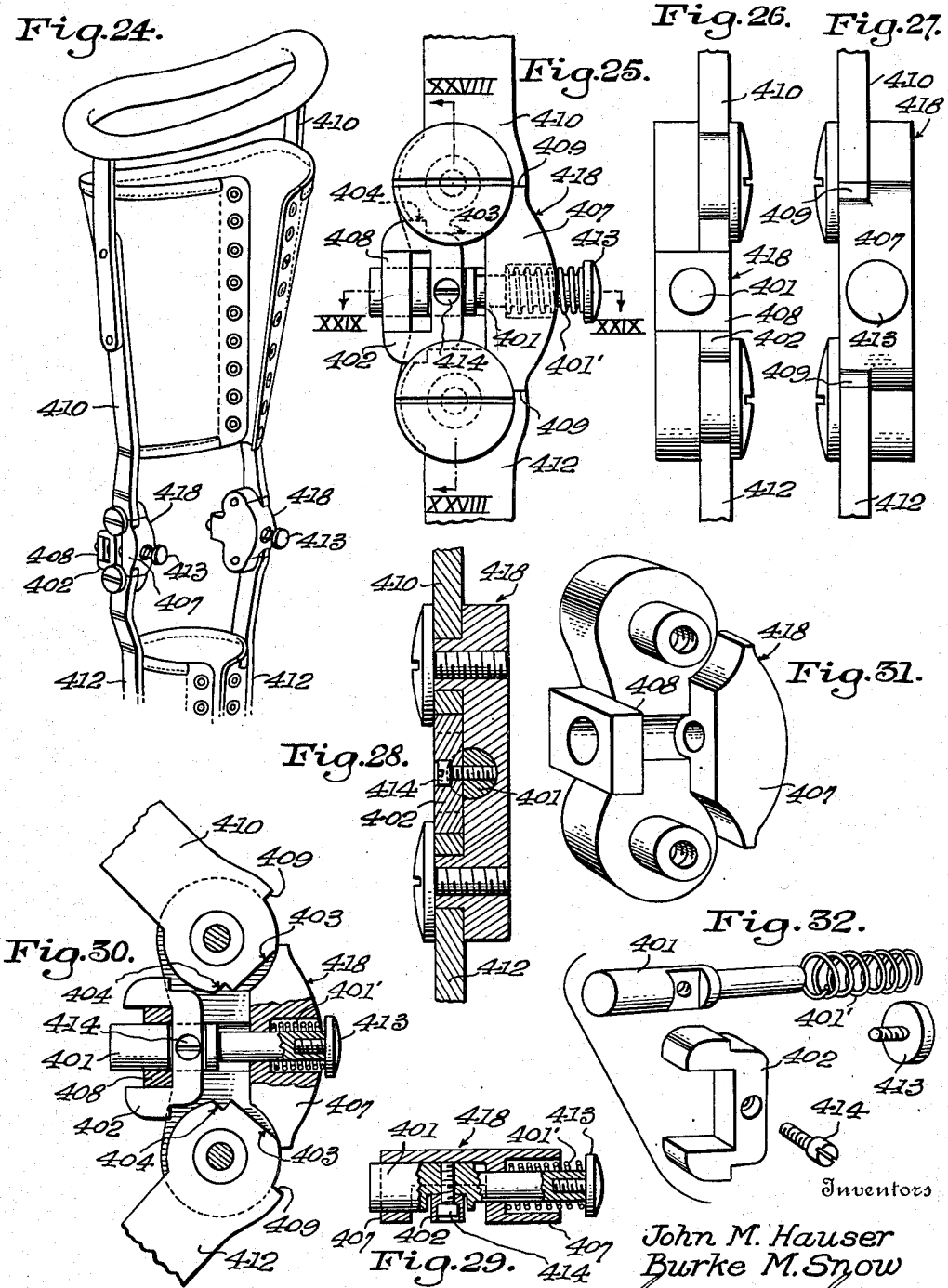

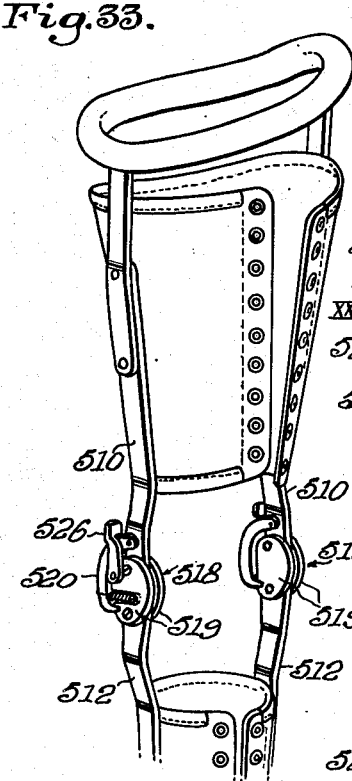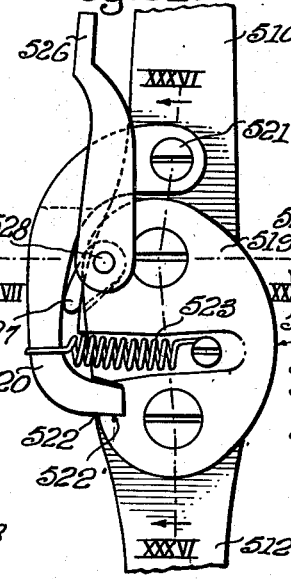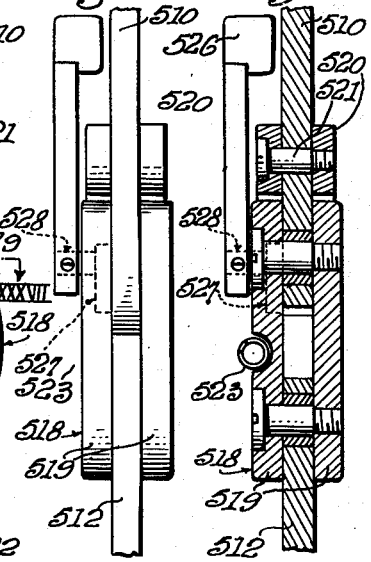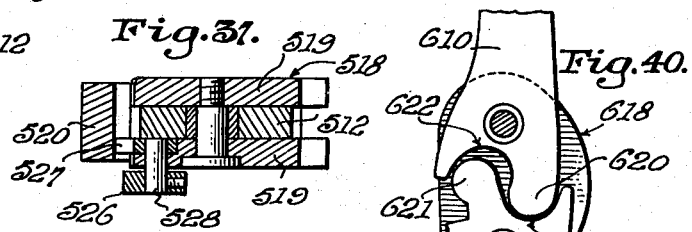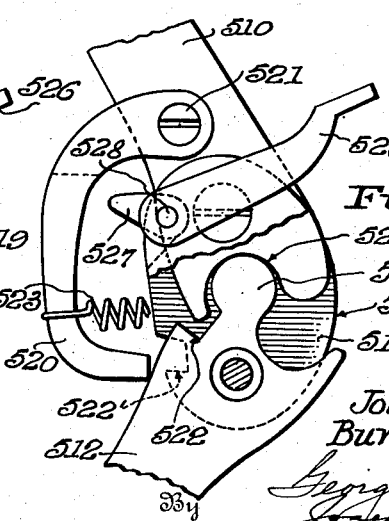

March 24, 1953     J. M. HAUSER ET AL     2,632,440
LEG BRACE JOINT AND LOCK
Filed Dec. 17, 1947     9 Sheets-Sheet 6

Inventors
John M. Hauser
Burke M. Snow
By
Attorneys

March 24, 1953  J. M. HAUSER ET AL  2,632,440
LEG BRACE JOINT AND LOCK
Filed Dec. 17, 1947  9 Sheets-Sheet 7
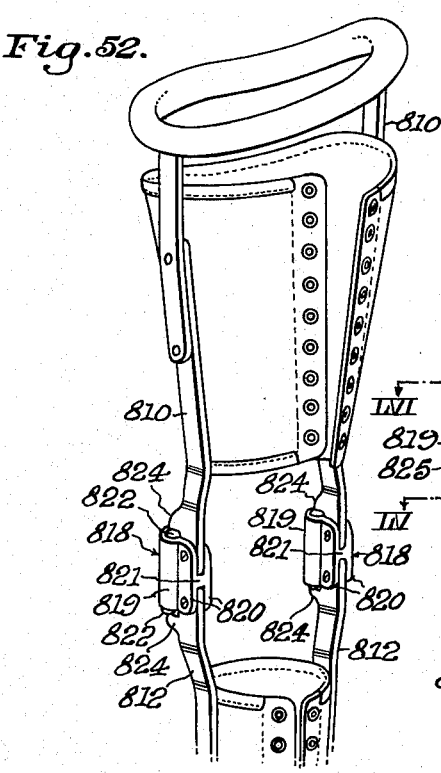
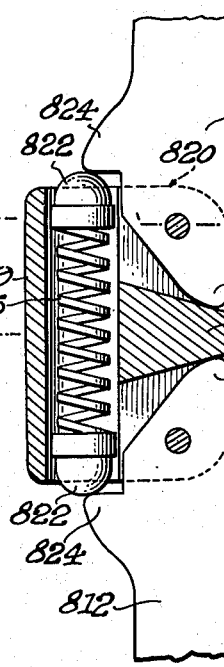
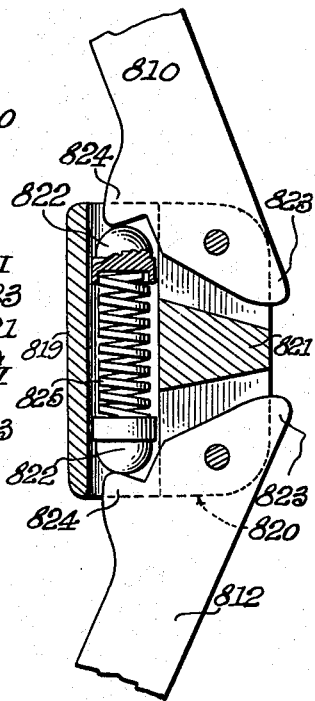
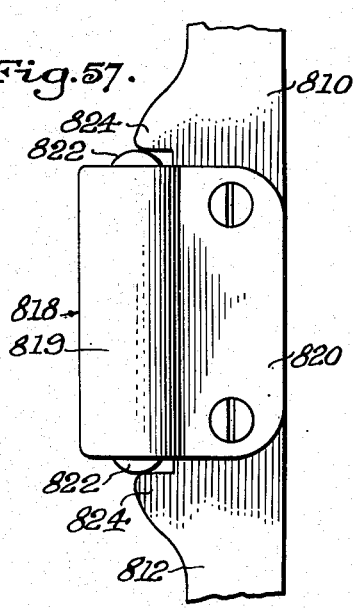
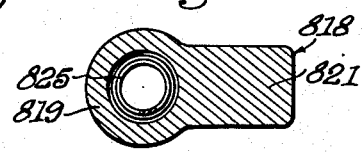
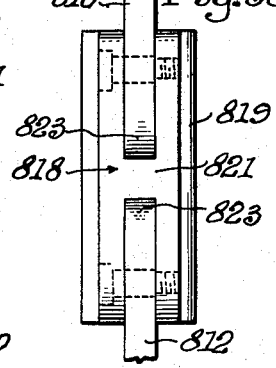
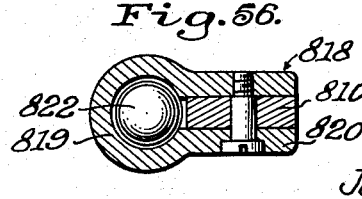
Inventors
John M. Hauser
Burke M. Snow
By
George W. Gerdes
Attorneys

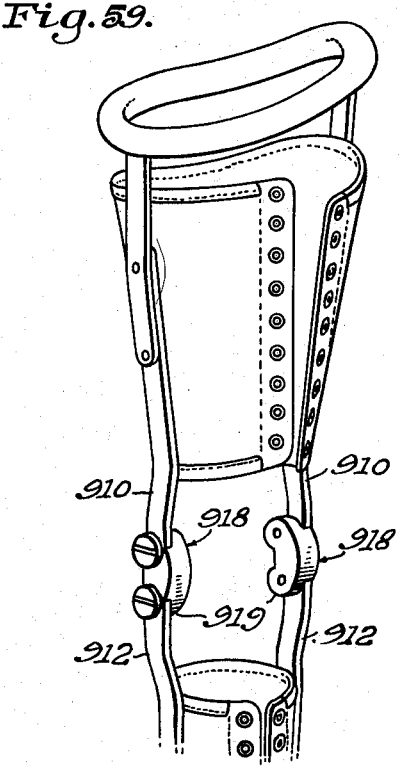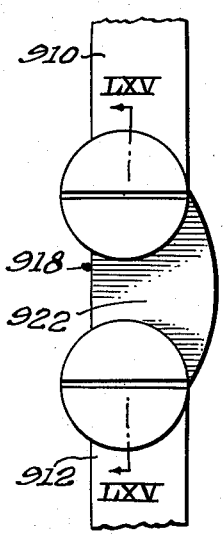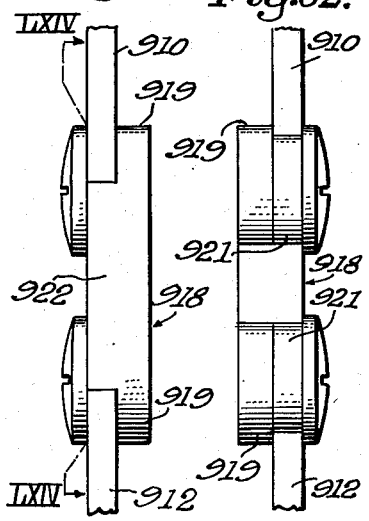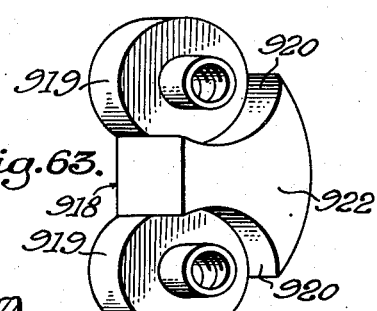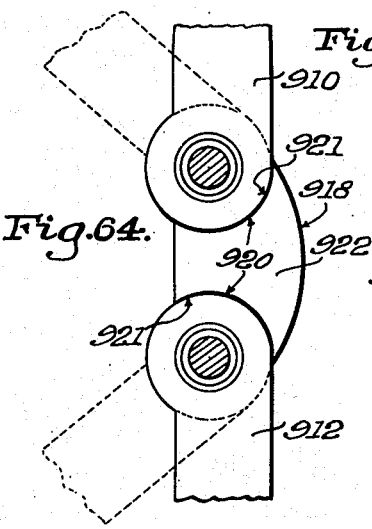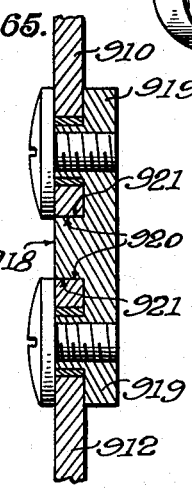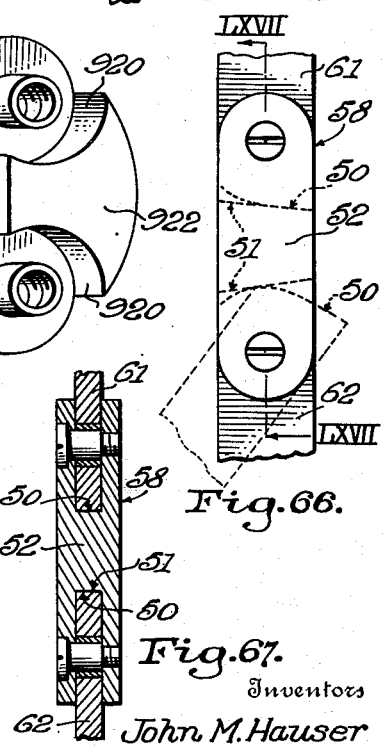

March 24, 1953 J. M. HAUSER ET AL 2,632,440
LEG BRACE JOINT AND LOCK
Filed Dec. 17, 1947 9 Sheets-Sheet 9
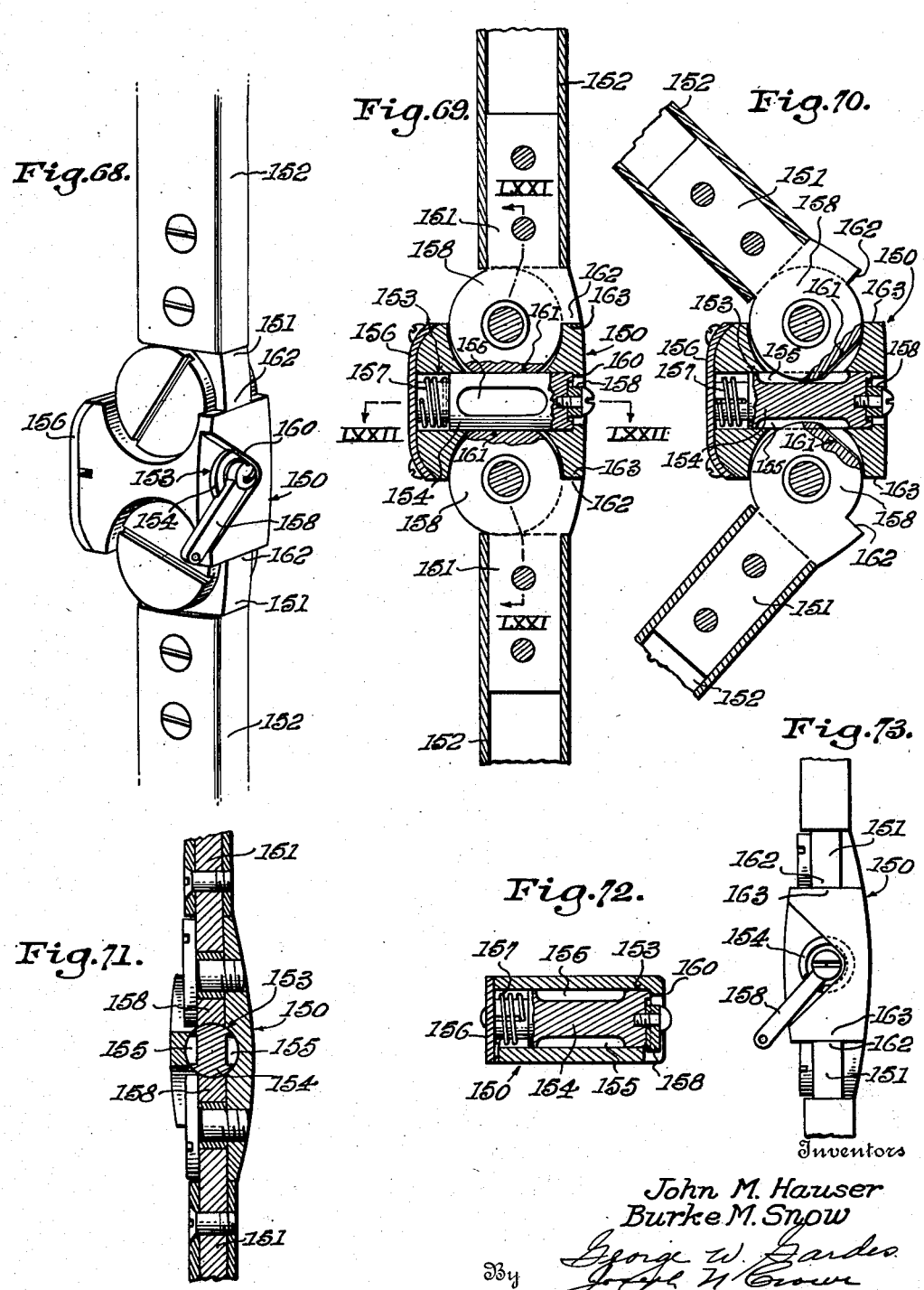
Inventors
John M. Hauser
Burke M. Snow
By
Attorneys Patented Mar. 24, 1953

2,632,440

UNITED STATES PATENT OFFICE 2,632,440

LEG BRACE JOINT AND LOCK

John M. Hauser, Takoma Park, Md., and Burke McArthur Snow, Washington, D. C.

Application December 17, 1947, Serial No. 792,250

10 Claims. (Cl. 128—80)

(Granted under Title 35, U. S. Code (1952), sec. 266)

The invention described herein may be manufactured and used by or for the Government for governmental purposes, without payment to us of any royalty thereon.

The problem of providing efficient prosthetic appliances has received considerable attention both from the standpoint of injuries sustained by military personnel during combat, and also because of the prevalence of crippling infections among civilian population. Many types of injuries impair the normal function of the limbs, and the problems of lessening the crippling effects of a variety of disease infections which produce muscular weakness and degeneration, and of assisting individuals who have been damaged both from exterior and internal causes are active ones, particularly during military operations and as an aftermath thereto.

Many individuals who otherwise would be temporarily or permanently invalided from various causes are assisted by mechanical braces which, when properly fitted, may enable an otherwise relatively helpless patient to be ambulatory. Such brace accessories must possess certain requirements as to fit and as to shifting the weight of the patient from an injured or damaged leg to the brace.

The present invention provides, specifically, an improved leg brace for assisting crippled individuals of any degree of impaired functions to walk. In accordance with the present invention, there is provided a leg brace which may be manufactured readily, easily applied and removed by the patient, and which is characterized by a naturalness of movement between cooperating parts, which follow closely the movements of natural joints.

A further object of the invention is to provide a brace having the above-indicated characteristics which relieves efficiently the damaged leg from the weight of the individual, transferring this weight from the skeletal structure of the legs and feet to the brace appliance.

A further object of the invention is to provide an improved leg brace of the above-indicated character which can be manufactured easily by mass production methods of parts which are simple to manufacture and assemble, and which are readily capable of being taken apart, and interchanged with other similar units or parts which are produced readily in standardized manner by standard fabricating operations.

A still further object of the invention is to provide a leg brace which combines strength with lightness in weight and ease of fabrication of the parts. To this end, the braces of the invention are fabricated preferably from aluminum or light metal alloys of well-known composition which combine strength with ease of fabrication and lightness of weight.

A still further object of the invention is to provide an improved, light-weight leg brace which permits a substantially normal walking motion without imparting stresses or strains on the brace, while efficiently transferring the weight of the individual from the damaged leg to the appliance.

Further objects and advantages of the present construction will become apparent as the description proceeds, and the features of novelty will be pointed out with particularity in the appended claims.

Generally speaking, the advantages of the present invention are obtained by making a brace that is intended to enclose the damaged leg from the thigh to the angle, the brace comprising a thigh section and a leg section which are reenforced with a suitable number of bands or corsets adapted to encircle the thigh and leg sections and to support and engage the thigh, calf and ankle portions of the leg to be braced. The thigh and leg sections are interconnected by a novelacting double joint which follows the normal bending action of the knee-joint of the leg, as will be pointed out in detail hereinafter. This type of brace permits a normal walking motion of the individual, while allowing the brace to conform to the individual deformities of the damaged leg.

There are two general modifications of braces contemplated by the present invention, which modifications are directed to the details of the aforesaid double joint between the brace sections. In one form, the joint is continuously free to move, whereas in the other and preferred modification, control of relative movement between the brace sections is effected by the provision of various types of locking instrumentalities which are so arranged that the brace sections and locking instrumentalities may be adjustably held in predetermined positions, thereby effecting a control of the double joint forming one of the features of the present improved construction.

With the foregoing and other objects in view, the invention consists in details of construction, and in the arrangement and combination of parts to be hereinafter more fully set forth and claimed.

In describing the invention in detail, reference will be had to the accompanying drawings forming part of the application, wherein like characters denote corresponding parts in the several views, and in which:

Figure 1 is a perspective view showing the improved form of leg brace provided with a lever-operated, rotary lock, double-hinged pivotal knee joint;

Figure 2 is a side elevation showing a portion of a lateral bracing member including the knee joint when the brace is in extended and locked position;

Figure 3 is a side elevation showing a portion of the lateral bracing member including the knee joint when the brace is in flexed and unlocked position;

Figure 4 is a sectionized view, the section being taken on the line IV—IV of Figure 2;

Figure 5 is a perspective view showing the central bearing member, the pivotally mounted support members, portions of an upper and a lower lateral brace, and the rotary lock member;

Figure 6 is a perspective of the central bearing member, similar to that shown in Figure 5, with the stays and locking member removed, showing the bearings for the stays projecting therefrom;

Figure 7 is a perspective view showing the upper portion of another modified form of leg brace;

Figure 8 is a side elevation showing a portion of a lateral bracing member including the knee joint when the brace is in extended and locked position;

Figure 9 is a side elevation showing a portion of the lateral bracing including the knee joint when the brace is in flexed and unlocked position;

Figure 10 is a sectionized view, the section being taken on the line X—X of Figure 8;

Figure 11 is a perspective view showing the central bearing member;

Figure 12 is a side elevation showing a further modified form of the device in which the locking member is moved laterally to effect engagement and disengagement with the pivotally mounted support members;

Figure 13 is a sectionized elevation, the section being taken on the line XIII—XIII of Figure 12 and illustrating the central portion of a lateral brace when the laterally movable locking member is in locked position;

Figure 14 is a similar view to Figure 13, showing the locking member in unlocked position;

Figure 15 is a perspective view showing the upper portion of a further modified form of the device in which the locking member is anteriorly-posteriorly, slidably mounted within the central bearing member operated by levers located laterally to said bearing member;

Figure 16 is a side elevation showing a portion of the lateral bracing members, including the central bearing member, when the brace is locked in extended position;

Figure 17 is an end elevation of the structure shown in Figure 16;

Figure 18 is a side elevation showing a portion of the lateral bracing members, including the knee joint, when the brace is unlocked and in extended position;

Figure 19 is a partially sectionized side elevation, the section being taken on the line XIX—XIX in Figure 17;

Figure 20 is a partially sectionized side elevation similar to that shown in Figure 19, but with the locking member in unlocked position and the lateral brace in flexed position;

Figure 21 is a sectional view of the knee joint, the section being taken on the line XXI—XXI of Figure 16;

Figure 22 is a sectionized elevation, the section being taken on the line XXII—XXII of Figure 16;

Figure 23 is a side elevation showing another modified form of the device provided with an anteriorly-posteriorly, slidable locking member operated by a disc-shaped lever;

Figure 24 is a perspective view showing the upper portion of a further modified form of the device in which the locking member is anteriorly-posteriorly, slidably mounted within the central bearing member and is operated by a push button located anteriorly to said bracing member;

Figure 25 is a side elevation showing a portion of the bracing members, including the central bearing member, when the brace is in locked extended position;

Figure 26 is an elevation showing a posterior view of the structure illustrated in Figure 25;

Figure 27 is an elevation showing an anterior view of the structure illustrated in Figure 25;

Figure 28 is a sectionized view, the section being taken on the line XXVIII—XXVIII of Figure 25;

Figure 29 is a sectionized view, the section being taken on the line XXIX—XXIX of Figure 25;

Figure 30 is a partially sectionized side elevation showing a portion of the bracing member, including the central bearing member, when the brace is in unlocked and flexed position;

Figure 31 is a perspective view of the central bearing member;

Figure 32 is a perspective showing in detail the construction of the various parts of the locking mechanism;

Figure 33 is a perspective view showing the upper and central portion of another modified form of the device in which the superior and inferior bracing members are rotatably engaged and move in unison, and in which the locking device is of the cam and lever type;

Figure 34 is a lateral elevation showing the bracing members in extended and locked position;

Figure 35 is an end elevation of the device as shown in Figure 34;

Figure 36 is a partially sectionized elevation, the section being taken on the line XXXVI—XXXVI of Figure 34;

Figure 37 is a partially sectionized plan view, the section being taken on the line XXXVII—XXXVII of Figure 34;

Figure 38 is a side elevation showing the superior and inferior bracing members in vertical alignment and the locking mechanism in unlatched position;

Figure 39 is a side elevation showing the superior and inferior bracing members in flexed position and the locking mechanism in unlatched position;

Figure 40 is a side elevation of a modified form of brace joint having interlocking bracing members freely movable in unison;

Figure 52 is a perspective view showing the upper and central portion of a still further modified form of the device which is not provided with a locking mechanism and in which the leg braces are flexed against the action of a spring;

Figure 53 is a partially sectionized, lateral elevation showing the spring located in the central bearing section retaining the brace in extended position;

Figure 54 is a partially sectionized lateral elevation showing the bracing members flexed against the action of the spring which is enclosed within the central bracing member;

Figure 55 is a sectionized view, the section being taken on the line LV—LV of Figure 53;

Figure 56 is a sectionized view, the section being taken on the line LVI—LVI of Figure 53;

Figure 57 is a lateral elevation showing an exterior view of the central bearing section with a portion of the upper and lower bracing members in extended position;

Figure 58 is an end elevation showing an anterior view of the central bearing member and a portion of the braces as shown in Figure 57;

Figure 59 is a perspective view showing the upper and central portion of another modified form of the device, in which the central bearing member is not provided with a locking mechanism and in which the upper and lower braces are only allowed to flex posteriorly due to the arcuately-formed central portion of the bearing member;

Figure 60 is a lateral elevation of the device showing the bracing members in extended position;

Figure 61 is an end elevation of the modified form of the device in Figure 59 showing an anterior view thereof;

Figure 62 is an end elevation of the modified form of the device illustrated in Figure 59, showing a posterior view thereof;

Figure 63 is a perspective showing the construction of the central bearing member;

Figure 64 is a sectionized view taken on the line LXIV—LXIV of Figure 61, showing the central bearing member with upper and lower braces pivotally connected thereto and showing in dotted lines the braces in flexed position;

Figure 65 is a sectionized view, the section being taken on the line LXV—LXV of Figure 60;

Figure 66 is a lateral elevation of still another modified form of the invention, showing a central bearing member which is slotted at either end thereof and into which slots the upper and lower lateral braces are pivotally mounted;

Figure 67 is a sectionized elevation, the section being taken on the line LXVII—LXVII of Figure 66;

Figure 68 is a perspective view showing a preferred form of the device in which the locking member is rotatably mounted within the central bearing member between the adjacent ends of the upper and lower stays on an anteriorly-posteriorly extending axis;

Figure 69 is a partially sectionized lateral elevation showing the arrangement of the central locking member when the stays are extended and locked longitudinally;

Figure 70 is a partially sectionized lateral elevation showing the knee joint in flexed position;

Figure 71 is a sectionized view, the section being taken on the line LXXI—LXXI of Figure 69;

Figure 72 is a sectionized view, the section being taken on the line LXXII—LXXII of Figure 69; and Figure 73 is a front elevation of the knee joint showing the lock operating lever.

Figure 41:
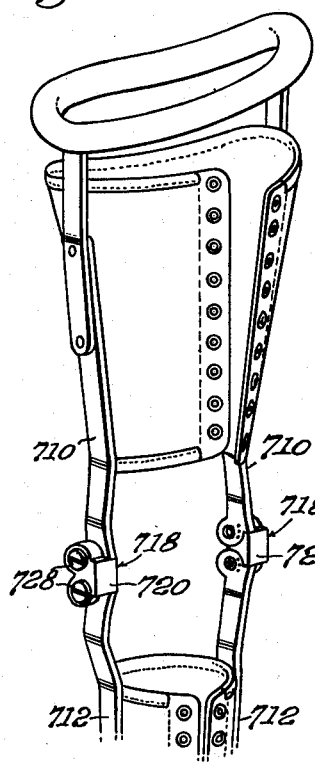
Figure 41 is a perspective view showing the upper and central portion of another modified form of the device.

In the description which follows it will be noted that the knee joints shown are constructed with double pivotal connections located on the central bearing member which may or may not contain a locking apparatus.

Figs. 1, 2 and 3 show one form of the improved leg brace, having a double pivoted locking type knee joint. The numeral 10 indicates the upper, longitudinal stays which are connected to a padded ischial ring member 11 and to the central bearing members 18 of the knee joints. The numeral 12 indicates the lower, longitudinal stays which are formed with upper and lower sections 13 and 14, respectively, which are overlapped and riveted together for means of adjustment. The upper sections 13 are connected to the central bearing members 18 and the lower sections 14 are connected with double pivotal ankle bearing joints 15 which, in turn, are connected to the stirrup member 16 attached to the shoe 17. The centrally located ends of the stays are connected to the central bearing members 18, either directly or by means of end connecting members 29 and 30. The longitudinal stays may be of tubular or solid bar construction.

Referring to Figs. 4, 5 and 6, it will be noted that the central bearing member 18 is formed with a centrally located bearing surface 20, having circularly formed walls 21 and 21', and a concentrically arranged tapped hole 23 for the reception of a pivot screw 24 which is adapted to retain a circular-shaped locking member 25 within the bearing space formed by the walls 21 and 21' and the bearing surface 20.

The end portions 26 of the bearing member 18 are also circular-shaped and are provided with machined surfaces 27, and with centrally tapped openings 42 for the reception of the screws 28. These end portions 26 are adapted to retain, in pivotal connection, the end members 29 and 30 of the stays 10 and 12, which are of circular contour and provided with machined contact surfaces. These end members 29 and 30 are held in contact with the end portions of the bearing members by means of the screws 28 which fit within sleeves 41 formed integrally with the bearing members 18. The lateral portions of the bearing member project beyond the surface of the end and central portion, all of which lie in the same plane. These surfaces, which are indicated by the numerals 20 and 27, are machined and form bearing surfaces respectively for the pivoted connecting members of the stays and for the rotary locking member 25.

Instead of providing the stays 10 and 12 with end members 29 and 30, the ends of the stays 10 and 12 may be machined and utilized as pivotal connections.

The rotary locking member 25 fits snugly within the circular-shaped opening formed by the walls 21 and 21' of the central bearing member, the clearance being just sufficient to allow the locking member to rotate freely. Opposite sides of the rotary locking member are provided with arcuately cut-away portions 32 and 32' having the same curvature as the circular end pieces which are pivotally connected to the bearing member, so that the stays may be moved angularly when these arcuately cut-away portions are adjacent their circular surfaces 34 and 35. The end pieces also are provided with arcuately cut-away portions 33 which, when positioned so that they are adjacent the circular portion of the locking member, serve to retain the end portions and the stays in locked position.

The rotary locking member 25 is provided with a small screw 31 which projects from its exposed surface when the said rotary member is retained on its base by the screw 24. This pin is adapted to slide within an elongated opening 36 in a lever member 37 which is pivotally connected to the bearing member 18 by the screw 38 so that, with movement of the lever, rotation of the locking member is effected. The locking member 25 is returned to locking position by means of the spring 22'. The lever is operated through links 39 which are connected to an arcuately formed lever 40 which is pivotally connected to the upper stays 10.

The ends of the stays 10 and 12 are each provided with shoulders 45 so that, when the wearer of the brace has his leg outstretched or straight and the stays are in longitudinal alignment, the shoulders 45 contact the forward abutments of the central bearing member and thus prevent the angularity of the stays from passing an angle of 180° or a straight line.

It will be noted in the construction that the weight of the patient's body is transmitted through the upper braces 10 to the rotary locking member 25, and from the rotary locking member to the lower braces 12, thus relieving the pivotal supports of pressure. The construction in which the pressure is transmitted from one bearing member to the other is found in all of the modified forms of the device.

Figs. 7 to 11, inclusive, show a modified form of the device which is constructed very similarly to the form set forth in Figs. 1 to 6, inclusive.

Fig. 7 illustrates a form of improved leg brace having a double pivoted locking knee joint in which the locking member comprises a rotary cam. The numeral 110 indicates the upper stays which are connected to an ischial ring 111, and to the central bearing members 118 of the knee joints. The numeral 112 indicates the lower stays, only the upper portions of which are shown. The upper ends of the lower stays 112 are connected to the central bearing members 118 and the lower portions thereof (not shown) are connected to a pivotal ankle bearing joint which in turn is connected to a stirrup as shown in Fig. 1. The centrally located ends of the stays are connected to the central bearing members 118 either directly or by means of end connecting members 129 and 130.

Referring to Figs. 8 to 11, it will be noted that the central bearing member 118 is formed with a centrally located bearing surface 120 having circularly formed walls 121 and 121', and a concentrically arranged tapped hole 123 for the reception of a pivot screw 124, which is adapted to retain a circular cam-shaped locking member 125 within the bearing space 120.

The end portions 126 of the bearing members 118 are also circular-shaped and are provided with machined surfaces 127 and with centrally tapped openings 142 for the reception of screws 128. These end portions 126 are adapted to retain in pivotal connection the end members 129 and 130 of the stays 110 and 112 which are of circular contour and provided with machined contact surfaces. The end members 129 and 130 are drilled for reception of bearings 141 which extend from the ends of the central bearing member 118. The stays are held in contact with the end portions of the bearing member 118 by means of screws 128 which fit within the bearings 141 and engage the threaded openings 142 and thereby retain the stays in pivotal connection with the bearing members. The lateral portions of the bearing members project beyond the surface of the end and central portion, all of which lie in the same plane. These surfaces are indicated by the numerals 120 and 127, respectively, are machined and form bearing surfaces for the pivotal connecting members of the stays and for the rotary locking member.

The rotary cam-shaped locking member 125 fits snugly within the circular-shaped opening formed by the walls 121 and 121' of the central bearing member, the clearance being just sufficient to allow the locking member to rotate freely. Opposite sides of the locking member are flattened or have straight cut-away portions leaving flat parallel surfaces 132 so that the stays may be moved angularly when the cut-away portions are adjacent the circular surfaces 134 and 135 of the stays. The end pieces are provided with arcuately cut-away portions 133 which, when positioned so that they are adjacent the circular portion of the locking member, serve to retain the end portions and stays in locked position.

The rotary member 125 is provided with a lever arm 131 which projects from the side thereof and which is used to rotate the same through a connecting link 146 which is connected to an operating lever 147. The operating lever 147 is retained in raised position by an elastic member 113 which is attached to the operating lever and to a strap 144 which is connected to the stays 110. To move the rotary locking member into inoperative position, the lever 147 is depressed against the action of the elastic member 113.

The ends of the stays 110 and 112 are each provided with shoulders 145 so that, when the wearer of the brace has his leg extended and the upper and lower stays 110 and 112 respectively are in longitudinal alignment, the shoulders 145 contact the forward abutments of the central bearing member and thus prevent the angularity of the stays from passing an angle of 180° or a straight line.

Figs. 12, 13 and 14 show another modified form of the device in which the locking mechanism is operated by a push button 201 which may be formed integrally with a slidable latching member 225. The central bearing member 218 is formed with a central circular well 202 in which the latching member 225 is slidably mounted. The latching member is drilled centrally for the support of a spring 203 which retains the latching member in forward locked position. The end members 229, 230, of the stays are pivotally connected to the central bearing member in the same manner as illustrated in the modification shown in Figs. 7 to 11, inclusive. These end members 229 and 230 terminate in arcs 231 which are concentric with their pivot openings, and the arcuate ends are provided with arcuately cut-away portions 233 which are engaged by the circular disc-shaped portion 225' of the locking member 225 when the locking member is in locked position.

In Figs. 15 to 22, inclusive, a modified form of the device is shown in which the locking mechanism is formed with a slidable locking member 301 which may be moved posteriorly-anteriorly within a central slot in the central bearing member so that it will lie between the flattened surfaces of the end members, 329 and 330, respectively, of the stays 310 and 312. The slidably mounted locking member or latch 301 is provided with a pin or screw 302 which projects through a slotted opening 303 in the central bearing member 318. This screw projects through a slotted opening 304 in a lever member 305 which is pivotally mounted on the central bearing member. A spring 306 is connected to the lever 305 and to the central bearing member 318. In this form of the device, the central bearing member is formed with a forward abutment 307 and a rear latch mounting member 308 in which the latch 301 is slidably mounted. The ends of the stays 310 and 312 are each provided with shoulders 309 so that, when the wearer of the brace has his leg outstretched or straight and the stays are in longitudinal alignment, the shoulders 309 contact the forward abutment 307 of the central bearing member and thus prevent the angularity of the stays from passing an angle of 180° or a straight line.

The end members 329 and 330 terminate in arcs 331 which are concentric with the pivot opening and the arcuate ends are provided with flat portions 323 which are engaged by the locking member 301 to retain the stays in outstretched or longitudinal alignment.

Fig. 23 shows the same form of device as illustrated in Figs. 15 to 22, inclusive, but with a modified form of operating lever. The lever 341 consists of a cam-shaped plate provided with a curved edge 342 and a projecting arm 343. The plate is pivotally mounted on the central bearing member by a screw 344. The plate is provided with a slotted opening which engages the screw or pin 302. The lever is operated by a Bowden wire 345 which is attached to the lever through a drilled hole 346 therein. The Bowden wire passes through a tube 347 connected to the upper stay 310 and is operated by a bell-crank lever 348 pivotally mounted on the stay.

Figs. 24 to 32, inclusive, show a modification in which the central bearing member 418 is provided with anterior and posterior laterally projecting portions 407 and 408 which are drilled centrally for slidably mounting a bolt member 401 therein. To the bolt member 401 is attached a U-shaped locking member 402 which engages the flat surfaces 403 and 404 at the ends of the stays 410 and 412, in order to retain them in longitudinal alignment.

The anterior, laterally projecting portion 407 is drilled centrally to a small and larger diameter to accommodate respectively the bolt 401 and a coiled spring 401' which surrounds the anterior end thereof and acts against the bottom of the larger opening and a knob 413 on the exterior end of the portion of the bolt which is of smaller diameter. The U-shaped member 402 is attached to the bolt 401 by a screw 414 the head of which projects laterally from the bolt. In order to limit the pivotal action of the stays they are provided with shoulders 409 which, when the stays are extended in longitudinal alignment, abut the anterior laterally extending portion 407 of the central bearing member.

In Figs. 33 to 39, inclusive, there is shown the construction of a modified form of a double pivoted knee joint, the adjacent ends of the upper and lower stays 510 and 512 of which are retained in meshing relation so that angular movement of one produces angular movement of the other. Simultaneous movement is effected by providing a projection 524 on the end of one of said stays which extends into a recess 525 on the end of the other stay.

The locking mechanism in this type of joint comprises a hook 520 which is pivotally connected by a screw 521 to the end of one stay and which engages a recess 522 in the opposite stay and a recess 522' in the central bearing member 518, the central bearing member being composed of parallel plates 519 to which the stays are pivotally connected. The hook is retained in locked position by a spring 523 which is connected to the bearing member 518. The hook 520 is disengaged from the recesses 522 and 522' by a lever 526 and cam 527, the lever 526 and cam 527 being mounted on a shaft 528 mounted in one of the plates 519. The cam-like action provides a polycentric motion, thus the upper and lower stays, although operating from separate pivot points, act in unison thereby obtaining equal movement of the stays about each pivot point when the lock is operated.

Fig. 40 shows another modified form which is similar to that shown in Figs. 33 to 39, inclusive. In the form shown in Fig. 40, no locking mechanism is shown. The end pieces of the stays 610 and 612, each of which is pivoted by separate pivotal connections to the central bearing member 618, are formed with S-shaped interlocking ends, so that the projecting portion 621 on stay 612 projects within a recess 622 on stay 610 and projecting portion 620 on stay 610 projects within recess 623 on stay 612.

Figure 42:
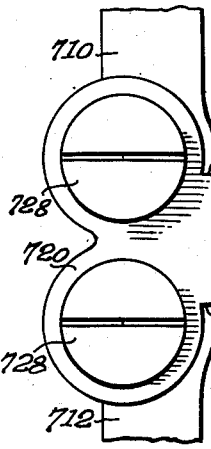
Figure 42 is a lateral elevation showing the bracing members in extended position.
Figure 43:
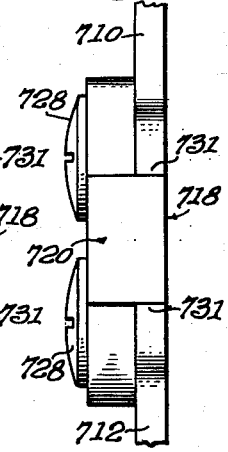
Figure 43 is an end elevation of the modified form of the device illustrated in Figure 42, showing an anterior view thereof.
Figure 44:
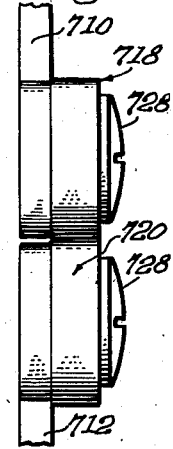
Figure 44 is an end elevation of the modified form illustrated in Figure 42 showing a posterior view thereof.
Figure 45:
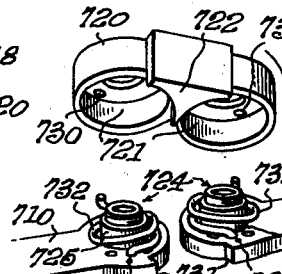
Figure 45 is a perspective showing the combined central bearing member and spring housing, the central portions of the superior and inferior bracing members, and the pivot bearings and coil springs.
Figure 46:
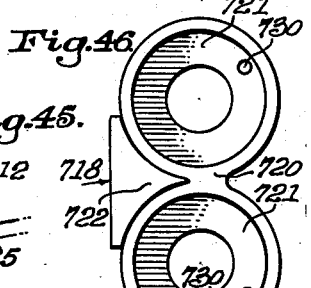
Figure 46 is an elevation of the combined central bearing member, and spring housing, showing the interior of the housing.
Figure 47:
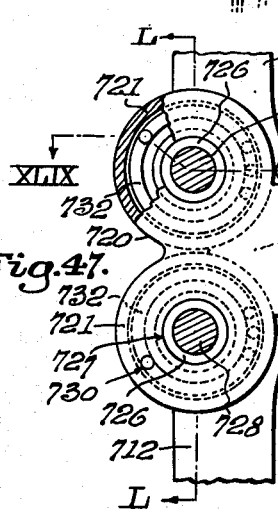
Figure 47 is a lateral elevation similar to that shown in Figure 42, but partially fractionated, and showing in dotted lines the arrangement of the coil spring.
Figure 48:
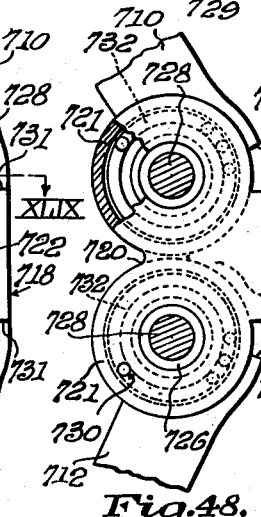
Figure 48 is a side elevation of the modified form of the invention similar to that shown in Figure 47, but with the upper and lower bracing members shown in flexed position.
Figure 50:
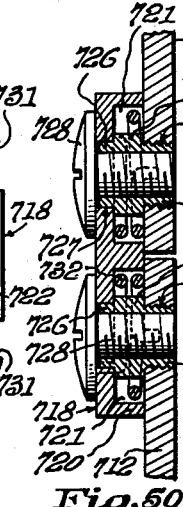
Figure 50 is a sectionized view, the section being taken on the line L—L of Figure 47.
Figure 51:
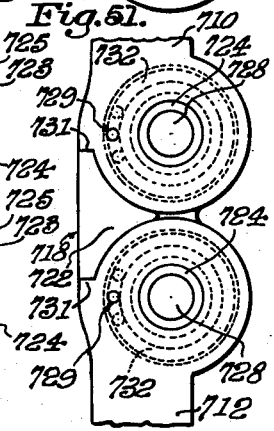
Figure 51 is an elevation, similar to that shown in Figure 47, but showing the opposite side thereof.
Figure 49:
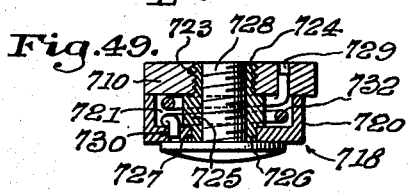
Figure 49 is a sectionized view, the section being taken on the line XLIX—XLIX of Figure 47.

Figs. 41 to 51 show a brace having a modified form of central bearing member 718, which comprises a housing 720 having two circular compartments 721 and a central abutment member 722. The ends of stays 710 and 712 are each drilled and tapped to receive the threaded end portion 723 of sleeve members 724.

These sleeve members are provided with a central circular portion 725 which is of larger diameter than the threaded portion 723. The other end portion 726 of the sleeve member 724 is of smaller diameter than the central portion 725 and rotatably fits within a circular opening 727 drilled in the top of each of the circular housings. The interior of the sleeve members 724 is tapped to receive the screws 728, which retains the housing 720 in contact with the stays. Both the stays and the top of the housing are drilled at 729 and 730, respectively, to receive the ends of coiled springs 732. The stays are provided with shoulders 731, and the springs retain the stays in longitudinal alignment with the shoulders 731 in contact with the abutment member 722. Thus, by motivating each joint with a helical spring, a mechanical means is provided to assist the muscular system in maintaining the joint at an extended position.

A modified form of contact bearing in which the stays are retained in longitudinal position or at 180° to each other by a longitudinal coiled spring is shown in Figs. 52 to 58, inclusive. This type of central bearing member 818 is formed with a longitudinal cylindrical portion 819 with parallel flat walls 820 projecting therefrom. The walls are united centrally by a wedge-shaped central abutment 821. Stays 810 and 812 are pivotally mounted between the parallel walls, and are provided with projecting portions 824 which function as abutments. A coil spring 825 is mounted within the cylindrical portion 819; caps 822 which have semi-spherical abutting portions are positioned at either end of the spring and serve to contact the projecting portions 824 of the stays and thus exert pressure on the stays to align them longitudinally as shown in Fig. 53. The stays are also provided with projecting end portions 823 which contact the central abutment 821 when the stays are longitudinally aligned at an angle of 180° to each other.

In Figs. 59 to 65, inclusive, is shown one of the simplest forms of the double pivoted central bearing member. In this form, central bearing member 918 is constructed with two circular disc-shaped end pieces 919 connected to a laterally projecting central portion 922 which functions both as a bearing portion for the end of the stays 910 and 912, which are shaped arcuately, and as an abutment to prevent the stays from attaining an angle of over 180°. The curved portions 920 of the central bearing member serve as bearing surfaces for the arcuate surfaces 921 of the stays.

A simpler form of central bearing member 58 is shown in Figs. 66 and 67, in which flat surfaces 50 of the stays 61 and 62 abut the flat surfaces 51 of the central abutment 52.

Figs. 68 to 73, inclusive, show another form of knee joint consisting of a central bearing member 150 to which are pivotally connected end pieces 151 of stays 152. The central bearing member 150 is provided with a centrally located shaft bearing 153 which extends anteriorly-posteriorly through the center thereof. Within the bearing 153 is rotatably mounted a locking shaft 154. The locking shaft 154 is provided with oppositely located, cut-out channels 155. The shaft is held within the bearing 153 by means of a cap 156 and one end of the central bearing member which extends partially across the end of the shaft, as indicated at 160. The shaft is held in locked position by means of a spring 157 and may be rotated by means of a lever 158. The end pieces 151 of the stays 152 terminate in segments of circular discs 158 which are flattened at one section thereof as indicated by the numeral 161, the surface 161 of the flattened portion being at right angles to the longitudinal axis of the stays.

The circular exterior surface of the shaft engages the flattened portions 161 of the ends of the stays and locks the braces in longitudinal position and, when the shaft is turned so that the channels 155 therein are opposite the ends of the braces, the arcuate portions of the ends can pass through the channels and thus allow the braces to assume a flexed position. The end members 151 of the stays 152 are each provided with shoulders 162 so that, when the wearer of the brace has his leg outstretched or straight and the stays are in longitudinal alignment, the shoulders 162 contact the forward abutments 163 of the central bearing member and thus prevent the angularity of the stays passing an angle of 180° or a straight line.

Having thus described our invention, what we claim and wish to secure by Letters Patent is:

1. A leg brace comprising upper and lower longitudinal stays having arcuately formed end portions with arcuate locking recesses therein, a knee joint comprising a central bearing member having a centrally located counterbored circular bearing recess, separate pivotal connections uniting said bearing member with the upper and lower stays of said brace, means in connection with the central bearing member for limiting the angular movement of said stays, a centrally located rotatably movable locking member mounted within said bearing recess, said locking member having arcuate bearing surfaces adapted to engage the arcuate recesses in the stays to lock them in longitudinal alignment and the locking member being provided with arcuate lateral recesses adapted to allow the arcuate portion of the stays to rotate within the bearing recess to permit unrestrained angular movement of said stays, a spring connected to the locking member and to the central bearing member adapted to urge the locking member into locked position, a pin projecting laterally and eccentrically from said rotatable locking member, a lever arm engaging said pin and pivotally mounted on said central bearing member, and an actuating lever pivotally connected to said stays and to said lever arm for moving the locking member out of locked position.

2. A leg brace comprising upper and lower longitudinal stays having arcuately formed end portions with arcuate locking recesses therein, a knee joint comprising a central bearing member having a centrally located countersunk bearing recess with a posterior aperture, separate pivotal connections uniting said bearing member with the upper and lower sections of said brace, means in connection with the central bearing member for limiting the angular movement of said stays, a centrally located rotatably movable locking member mounted within said recess, said locking member having arcuate bearing surfaces adapted to engage the arcuate recesses in the stays to lock them in longitudinal alignment and having flat lateral surfaces adapted to clear the circular portion of the stay ends to allow the free angular movement of said stays, lever arms extending from said rotary locking members, a link connected to said lever arms, and an actuating lever pivotally connected to said stays and to said link for controlling the operation of said link, an arcuate band connected to said upper stays, and an elastic member connected to said arcuate band and to said actuating lever adapted to urge the rotary locking member into locked position.

3. A leg brace comprising upper and lower longitudinal stays, a knee joint comprising a central bearing member having a centrally located anteriorly-posteriorly extending passage and a slot communicating with said passage, separate pivotal connections uniting said bearing member with the upper and lower sections of said brace, means in connection with the central bearing member for limiting the angular movement of said stays, a centrally located, horizontally movable locking member slidably mounted within said passage, a pin connected to said locking member and projecting through the longitudinal slot, and an operating lever provided with a longitudinal slot engaged by said pin, said lever being pivotally mounted on said central bearing member, and a spring connected to the lever and to the central bearing member adapted to urge the locking member into locked position.

4. A leg brace comprising upper and lower stays, said lower stay having an indentation on the edge thereof, a central bearing member having an indentation in the edge thereof, separate pivotal bearings pivotally connecting said stays with said central bearing member, a latch hook pivotally connected to one of said stays adapted to lock the stays in longitudinal position when the end of said lever engages the indentation in said central bearing member and in said lower stay, a spring adapted to urge the hook into locking position, and a lever pivotally mounted on said central bearing member.

5. A leg brace comprising upper and lower longitudinal stays having intermeshing S-shaped ends pivoted separately to a central bearing member, said intermeshing S-shaped ends functioning to effect angular movement of one of said stays with the angular movement of the other to limit the angular movement of both stays, and locking means on the brace for releasably locking the upper and lower stays in aligned position.

6. In combination with a leg brace, upper and lower longitudinal stays, a knee joint comprising a central bearing member having a centrally located, anteriorly-posteriorly extending passage, spaced pivots in the central bearing member disposed in longitudinal axial alignment therewith and connecting the upper and lower stays thereto, a locking member rotatably mounted in said passage, means retaining said locking member within said passage, means effecting rotation of the said locking member, and means formed integrally with said locking member for engaging and disengaging said stays to respectively retain them in longitudinal alignment and to permit relative angular movement thereof, the weight of a wearer's body being transmitted through the upper stays to the locking member and from the locking member to the lower stays, while avoiding substantial pressure on the said spaced pivots.

7. In combination with a leg brace, upper and lower longitudinal stays having arcuately formed end portions with flat surfaces formed on a secant to said arc, a knee joint comprising a central bearing member having a centrally located, anteriorly-posteriorly extending passage of circular cross-section, and a locking member rotatably mounted in said passage, said locking member having portions provided with oppositely arranged flattened surfaces defining abutments adapted to engage and disengage the end portions of the said stays to retain them in longitudinal alignment and to permit relative angular movement of the stays.

8. An ambulatory leg brace assembly comprising a frame including oppositely disposed stay members for engaging inner and outer surfaces of a leg of a wearer, a padded ischial ring member interconnecting the stay members at upper ends thereof, a relatively rigid thigh-enclosing sleeve secured to the stay members, said stay members and rigid enclosing sleeve forming a thigh section of the brace, a lower section of the brace assembly adapted to enclose the calf portion of a leg of a wearer and comprising oppositely disposed stay members aligned with the stay members of the thigh section of the brace assembly, a knee joint interconnecting the aligned thigh- and calf-stay members, a pair of spaced aligned pivot members positioned in the knee joint in longitudinal axial alignment with the corresponding thigh- and calf-stay members, the said pivot members adapted to be located adjacent to the knee of a wearer of the brace with one of the pivot members just above the knee and the other just below the knee, thereby enabling articulation of the frame sections in the manner similar to the normal articulation of the knee joint of the leg supported by the frame, and common locking means for the stay members intermediate the thigh- and calf-stay members, the said stay members and locking means being provided with cooperating cam-acting locking surfaces for preventing movement of the stays about the pivot points when the locking means are in locking position, actuating mechanism on the knee joint and within convenient accessibility of the wearer for simultaneously shifting the locking means into and out of locking engagement with the stay members for selectively rigidly interlocking and releasing the sections of the supporting frame, and stop means on the frame sections cooperating with the knee joint for preventing angular movement between the frame sections from passing the angle of 180° when the frame sections reach fully extended position.

9. An ambulatory leg brace structure having a calf section and a thigh section, each of these sections including oppositely disposed stay bars, the said stay bars of one of the sections being in alignment with corresponding stay bars of the other section when the brace structure is in fully extended position, and a knee joint interconnecting the thigh- and calf-section stay bars, the said knee joint including a pair of spaced aligned pivot members positioned in the knee joint in longitudinal axial alignment with the corresponding thigh- and calf-stay bars, the said pivot members adapted to be located adjacent to the knee of a wearer of the brace with one of the pivot members just above the knee and the other just below the knee, thereby enabling articulation of the calf section and thigh section of the brace in the manner similar to the normal articulation of the knee joint of the leg supported by the brace, and common locking means for the stay bars intermediate the thigh- and calf-stay bars, the said stay bars being provided with cooperating cam-acting locking surfaces for preventing movement of the bars about the pivot members when the locking means are in locking position, actuating mechanism on the knee joint and within convenient accessibility of the wearer for simultaneously shifting the locking means into and out of locking engagement with the stay bars for selectively rigidly interlocking and releasing the thigh and calf sections of the brace, and stop means on the said sections cooperating with the knee joint for preventing angular movement between the said sections from passing 180° when the sections reach fully extended position.

10. A knee joint for interconnecting corresponding bar members of a thigh section and a calf section of an articulated ambulatory leg brace, the knee joint including oppositely disposed links interconnecting the said corresponding bar members, each link having a pair of corresponding spaced aligned pivot members positioned in the knee joint at corresponding adjacent ends of the said corresponding bar members and in longitudinal axial alignment with the said bar members, the said pivot members adapted to be located adjacent to the knee of a wearer of the brace with one of the pivot members just above the knee and the other just below the knee, thereby enabling articulation of the calf section and thigh section of the brace in the manner similar to the normal articulation of the knee joint of the leg supported by the brace, and common locking means for the said corresponding bar members intermediate the said bar members, the said bar members and locking means being provided with cooperating cam-acting locking surfaces for preventing movement of the stay bars about the pivot points when the locking means are in locking position, actuating mechanism on the knee joint and within convenient accessibility of the wearer for simultaneously shifting the locking means into and out of locking engagement with the stay bars for selectively rigidly interconnecting the thigh and calf sections of the brace, and stop means on the stay bars cooperating with the knee joint for preventing angular movement between corresponding stay bars from passing the position of longitudinal alignment when the sections of the brace reach fully extended position.

JOHN M. HAUSER.
BURKE McARTHUR SNOW.

REFERENCES CITED

The following references are of record in the file of this patent:

UNITED STATES PATENTS

| Number | Name | Date |
|---|---|---|
| 50,770 | Lockwood | Oct. 31, 1865 |
| 489,258 | Marks | Jan. 3, 1893 |
| 552,143 | Rankin | Dec. 31, 1895 |
| 1,847,823 | Dresser | Mar. 1, 1932 |
| 2,267,848 | Taylor | Dec. 30, 1941 |
| 2,395,120 | Hinkle | Feb. 19, 1946 |
| 2,477,591 | Follis | Aug. 2, 1949 |